June 16, 1925.
H. SAUCKE
PIPE FITTING
Filed June 16, 1923
1,542,645
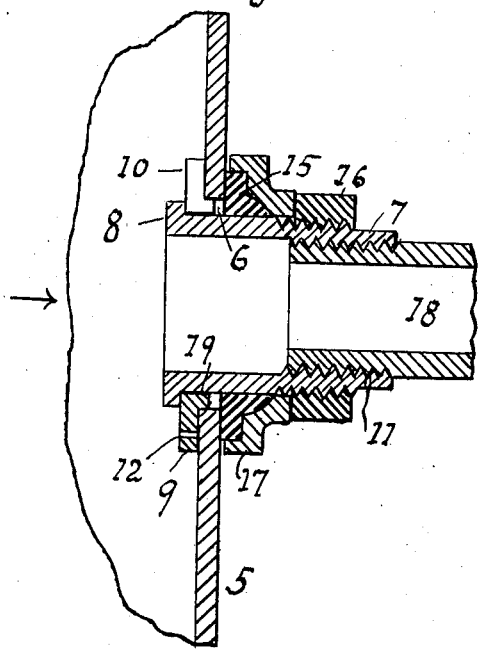
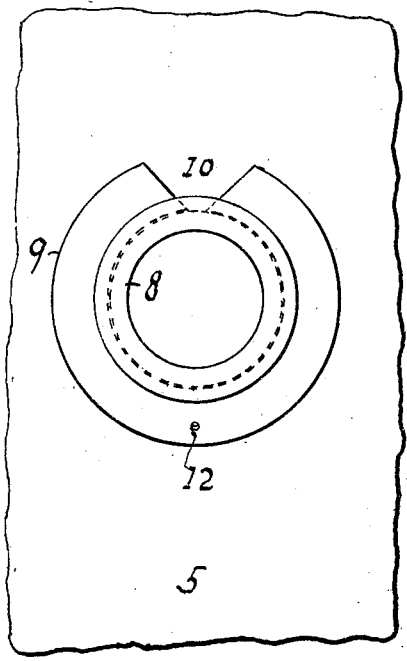
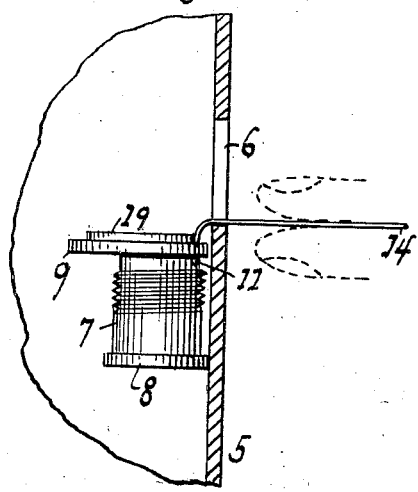
INVENTOR
Herman Saucke
BY his ATTORNEYS
Hauff Sbarland Patented June 16, 1925.

1,542,645

UNITED STATES PATENT OFFICE.

HERMAN SAUCKE, OF NEW YORK, N. Y.

PIPE FITTING.

Application filed June 16, 1923. Serial No. 645,761.

*To all whom it may concern:*

Be it known that I, HERMAN SAUCKE, a citizen of the United States, residing at New York, in the county of Bronx and State of New York, have invented new and useful Improvements in Pipe Fittings, of which the following is a specification.

This invention relates essentially to a pipe fitting which is adapted for connecting a kitchen range hot water boiler to a gas heater after it has been installed in a building and connected with the water system.

An object of the invention is to tap a boiler in which the interior is inaccessible so that a supplemental pipe connection with the boiler can be made without disarranging the other pipes.

Another object of the invention is to provide a nipple which can be turned or adjusted before it is locked in place so that when a pipe is connected therewith it will be unnecessary to employ a union or other coupling.

The invention resides more particularly in the novel combinations hereinafter described and claimed reference being made to the accompanying drawing in which:—

Fig. 1 represents a vertical section showing the pipe fitting attached to a portion of a boiler.

Fig. 2 is a side elevation looking in the direction of the arrow of Fig. 1.

Fig. 3 is a sectional view showing the method of stringing the nipple and washer.

In the drawing the numeral 5 designates a portion of the side of a hot water boiler the interior of which after it is set up in a dwelling is closed from the outside and therefor inaccessible. The boiler is equipped with an aperture 6 from which projects the stem 7 of a nipple provided with a flanged rear end 8 to prevent the nipple from being pulled out of the aperture. Between the flange of the nipple and the shell of the boiler is arranged a washer 9 having a notch 10 to permit it to be inserted into the boiler. The stem of the nipple at 11 and the washer at 12 each have a small hole to string them to a wire 14 best seen in Fig. 3. As indicated the flange 8 is of smaller diameter than the aperture in the boiler so that it can readily be pushed into the aperture after it is fastened to the wire. The notch or split in the washer permits it to pass through the aperture and be strung on the same wire that suspends the nipple they can both be pushed into the boiler and held by grasping the wire until they are arranged in place as indicated, in Fig. 1.

After the stem of the nipple is in its proper position a rubber or fibre packing ring 15 is slipped over the stem to seal the aperture in the shell of the boiler and prevent leakage. The stem has an exterior screw thread to engage a nut 16 made to jam a cap 17 loosely mounted on the stem against the packing to force it onto the wall of the boiler adjacent the aperture.

The nipple is also interiorly threaded to engage a pipe 18 which is screwed in before the nipple is tightened by the nut. The nipple can revolve about the aperture before it is locked by the nut so that the pipe 18 does not turn when screwed but is merely drawn in the nipple. In this arrangement the washer and the cap are shaped to fit the transverse curvature of the boiler. The diameter of the opening in the washer for slipping it on the stem of the nipple is smaller than the diameter of the aperture in the boiler so that the nipple cannot be drawn out of the aperture after it is positioned and the washer is in place. When the nut is tightened up it forces the flanged end of the nipple against the washer and the nipple is thus securely locked.

As indicated in Fig. 2 the notch in the washer is tapered the widest part of the gap being at the top so that it will give clearance room to easily introduce the washer into the aperture. The notch is narrow at the bottom so as to obviate any excessive opening for the liquid to leak through. The washer is substantially rigid and it has a hub or shoulder 19 to engage the aperture in the boiler. This hub stiffens the washer and at the same time contributes to seal the aperture.

I claim:—

1. In a pipe fitting the combination with a receptacle inaccessible from the exterior provided with an aperture, of a nipple having a threaded stem projecting from the aperture, means removably mounted on the nipple adjacent the inner portion of the aperture and the wall of the receptacle for preventing the nipple from being drawn out, and a nut engaging the stem to lock the nipple.

2. In a pipe fitting the combination with a receptacle inaccessible from the exterior provided with an aperture, of a flanged nipple having a threaded stem projecting from the aperture, a notched washer arranged between the flange and the inner surface of the receptacle adjacent the aperture to prevent the nipple from being drawn out, and a nut engaging the threaded stem to lock the nipple.

3. In a pipe fitting the combination with a receptacle inaccessible from the exterior provided with an aperture, of a flanged nipple having a threaded stem projecting from the aperture the flange being of smaller diameter than the aperture, a washer of greater diameter than the aperture with a tapered notch mounted on the stem between the flange and inner portion of the receptacle adjacent the aperture to prevent withdrawal of the nipple, a packing arranged on the outer portion of the receptacle opposite the washer, a cap to position the packing against the wall of the receptacle, and a nut engaging the threaded stem to force the cap against the packing.

4. In a pipe fitting the combination with a receptacle inaccessible from the exterior provided with an aperture, of a flanged nipple having a threaded stem projecting from the aperture the flange being of smaller diameter than the aperture, a notched washer mounted on the stem between the flange and inner portion of the receptacle adjacent the aperture to prevent withdrawal of the nipple, said washer having a hub to coact with the aperture, a packing arranged on the outer portion of the receptacle opposite the washer, a cap to position the packing against the wall of the receptacle, and a nut engaging the threaded stem to force the cap against the packing.

In testimony whereof I have hereunto set my hand in the presence of two subscribing witnesses.

HERMAN SAUCKE.

Witnesses:
MARGUERITE ALTVATER,
WILLIAM MILLER.